United States Patent
Lee et al.

(10) Patent No.: US 7,206,655 B2
(45) Date of Patent: Apr. 17, 2007

(54) SYSTEM AND METHOD FOR ACQUIRING SEMICONDUCTOR PROCESS STATUS INFORMATION

(75) Inventors: Yuk-Tong Lee, Fongshan (TW); Chun-Ching Lin, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 652 days.

(21) Appl. No.: 10/624,370

(22) Filed: Jul. 21, 2003

(65) Prior Publication Data

US 2005/0021166 A1    Jan. 27, 2005

(51) Int. Cl.
    *G06F 19/00* (2006.01)
(52) U.S. Cl. ........................................ 700/121; 700/96
(58) Field of Classification Search ................ 700/96, 700/121
    See application file for complete search history.

(56) References Cited

U.S. PATENT DOCUMENTS

| | | | |
|---|---|---|---|
| 5,920,392 A | | 7/1999 | Tsai et al. |
| 5,956,523 A | * | 9/1999 | Chen ........................... 710/62 |
| 6,070,196 A | | 5/2000 | Mullen, Jr. |
| 6,208,904 B1 | * | 3/2001 | Mullen, Jr. .................... 700/9 |
| 6,230,080 B1 | * | 5/2001 | Lee et al. ................... 700/121 |
| 6,535,779 B1 | | 3/2003 | Birang et al. |
| 6,535,938 B1 | * | 3/2003 | Teramura et al. ........... 710/105 |
| 2004/0139210 A1 | * | 7/2004 | Lee et al. .................... 709/230 |

FOREIGN PATENT DOCUMENTS

| | | |
|---|---|---|
| JP | 0745489 | 2/1995 |
| JP | 10304008 | 2/1998 |

OTHER PUBLICATIONS

Singapore Office Action issued Aug. 7, 2006.

* cited by examiner

*Primary Examiner*—Albert W. Paladini
*Assistant Examiner*—Steven R. Garland
(74) *Attorney, Agent, or Firm*—Thomas, Kayden, Horstemeyer & Risley

(57) ABSTRACT

A system for acquiring semiconductor process status information. An equipment server outputs a start command according to a HSMS protocol to a computer system server, which converts the start command from the HSMS protocol to a RS232 protocol and outputs the converted command to a protocol converter. The protocol converter converts the start command from the RS232 protocol to a RS485 protocol and outputs the converted command to an AD/DA module. The AD/DA module converts the start command from the RS485 command to an analog signal and outputs the converted command to an external sensor, which acquires semiconductor equipment status information as initiated by the start command. The acquired status information is then sent on a reverse path to the start command, undergoing successive conversion and output until reaching the equipment server.

18 Claims, 3 Drawing Sheets

SYSTEM AND METHOD FOR ACQUIRING SEMICONDUCTOR PROCESS STATUS INFORMATION

BACKGROUND OF THE INVENTION

1. Field of the Invention

The present invention relates to a system for acquiring semiconductor process status information, and in particular to a system and method for converting semiconductor process status information to standard industrial protocol.

2. Description of the Related Art

It is important for semiconductor manufacturers to maintain yield and quantity of output from semiconductor equipment. Monitor procedures comprise acquiring semiconductor process status information on demand.

Semiconductor manufacturers utilizing computer integrated manufacturing systems normally acquire semiconductor process status information through SECS/GEM protocol, but some status values are not obtainable thereby, and must be acquired by external sensors, and manually reported.

Computer integrated manufacturing systems cannot, therefore, acquire complete semiconductor process status information from semiconductor equipment installations through SEC/GEM protocol. Operations are often missed thereby, decreasing efficiency and creating many potential problems, including possible production stoppage.

SUMMARY OF THE INVENTION

Accordingly, an object of the present invention is to provide a system and method for acquiring semiconductor process status information and providing the acquired values to an equipment server.

To achieve the above object, the present invention provides a system for acquiring semiconductor process status information, comprising an equipment server, a computer system server, a protocol converter, an AD/DA module and an external sensor.

An equipment server outputs a start command according to a HSMS (High Speed SECS Message Service) protocol. A computer system server connected to the equipment server converts the start command from the HSMS protocol to a RS232 protocol and outputs the converted start command to a protocol converter, which then converts the start command from the RS232 protocol to a RS485 protocol. The converted start command is then output to an AD/DA module for conversion to an analog signal. An external sensor is connected to the AD/DA module for acquiring semiconductor equipment status information as initiated by the start command. The external sensor outputs the status information to the AD/DA module, which converts the status information from the analog signal to the RS485 protocol and outputs the converted status information to the protocol converter. The protocol converter converts the status information from the RS485 protocol to the RS232 protocol and outputs the converted status information to the computer system server. The computer system server converts the status information to HSMS protocol and outputs the converted status information to the equipment server.

According to a method for acquiring semiconductor process status information, first a tool application program outputs a start command according to a first protocol. Then, the start command is converted from the first protocol to a second protocol and outputting the converted start command. Thereafter, the start command is converted from the second protocol to a third protocol and output. The start command is then converted from the third protocol to an analog signal and output. An external sensor is activated by the start command. The external sensor acquires at least one semiconductor process status information. Thereafter, the status information is converted to the third protocol and output. Then, the status information is converted from the third protocol to the second protocol and output. The status information is converted from the second protocol to the first protocol, and output to an equipment server.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
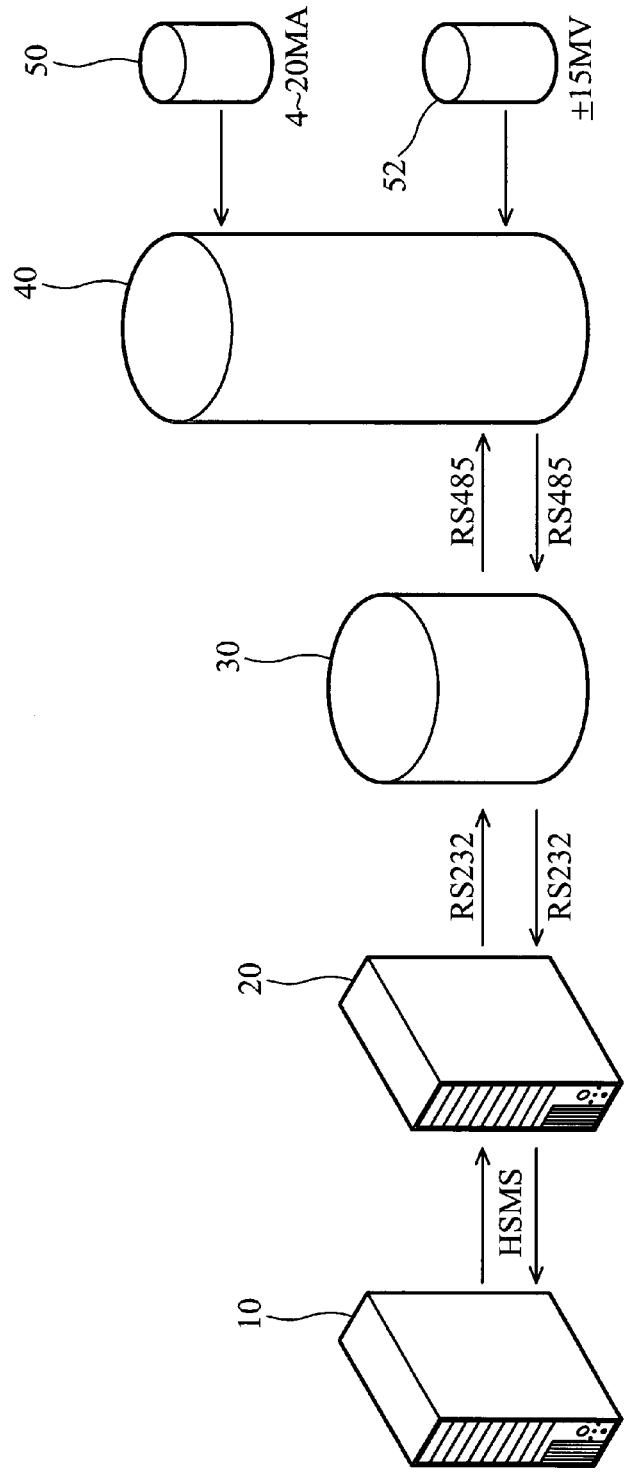
FIG. 1 is a schematic diagram showing the architecture of the system for acquiring semiconductor process status information according to the present invention.

FIG. 1 is a schematic diagram showing the architecture of the system for acquiring semiconductor process status information according to the present invention.

A system for acquiring semiconductor process status information comprises an equipment server 10, a computer system server 20, a protocol converter 30, an AD/DA module 40, a first external sensor 50, and a second external sensor 52.

An equipment server 10 outputs a start command according to a HSMS protocol and receives semiconductor process status information according to the HSMS protocol.

A computer system server 20 is connected to the equipment server 10 for converting the start command from the HSMS protocol to a RS232 protocol and outputting the converted command. The computer system server 20 receives semiconductor process status information according to the RS232 protocol.

A protocol converter 30 is connected to the computer system server 20 for converting the start command from the RS232 protocol to a RS485 protocol and outputting the converted command. The protocol converter 30 converts semiconductor process status information from RS485 protocol to RS232 protocol and outputs the converted information to the computer system server 20.

An AD/DA module 40 is connected to the protocol converter 30 for converting the start command from the RS485 protocol to an analog signal and outputting the converted command to the first external sensor 50 and the second external sensor 52. The AD/DA module 40 converts semiconductor process status information from the analog signal to the RS485 protocol and outputs the converted information to the protocol converter 30.

A first external sensor 50 and second external sensor 52 are connected to the AD/DA module 40 for acquiring semiconductor equipment status information as initiated by the start command. The first external sensor 50 and second external sensor 52 acquire semiconductor process status information such as standard current input ±4~20 mA and voltage input ±15 mV. The first external sensor 50 and second external sensor 52 both send semiconductor process status information to the AD/DA module 40.

Figure 2:
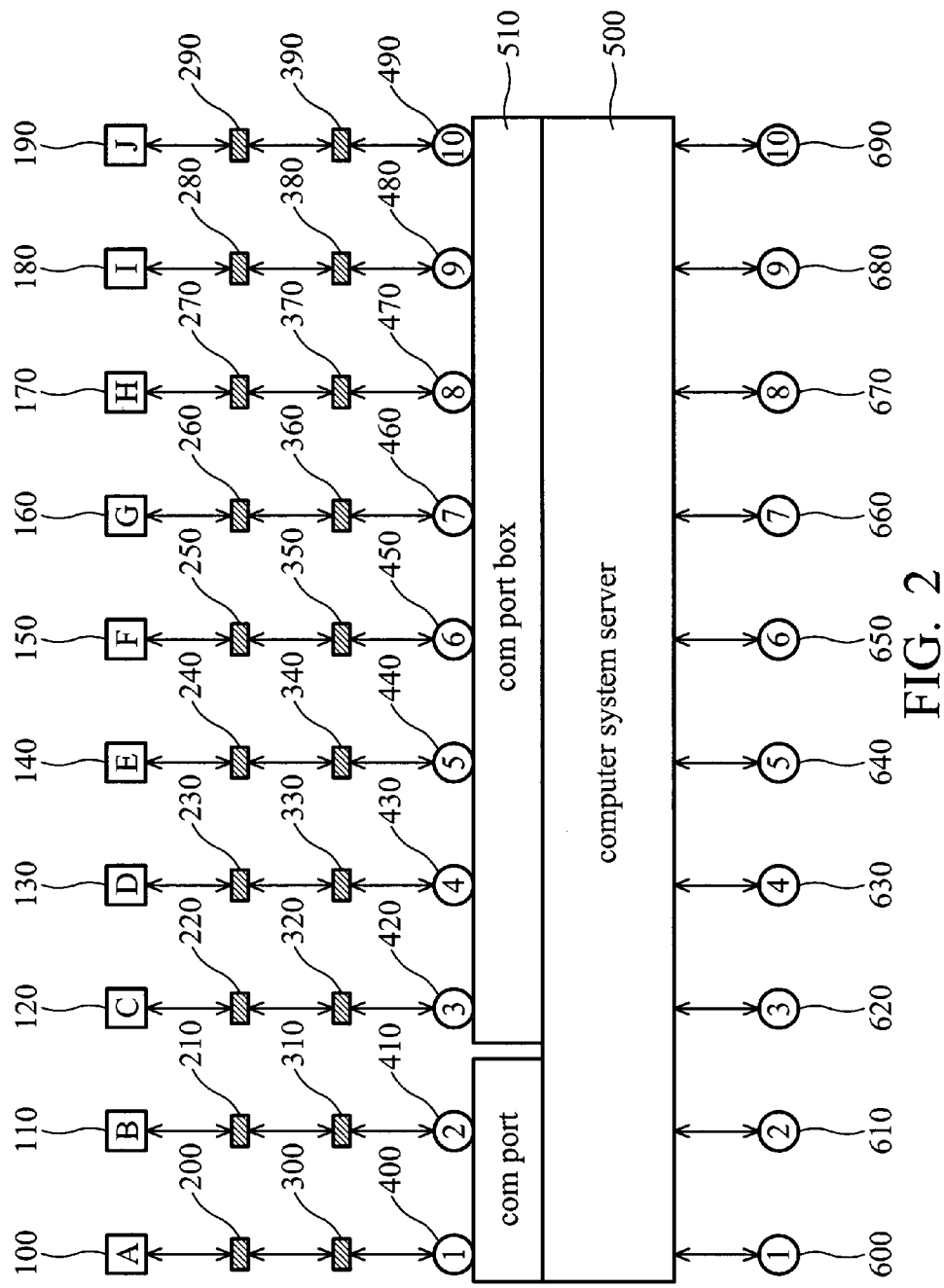
FIG. 2 is another schematic diagram showing the architecture of the system for acquiring semiconductor process status information according to the present invention.

FIG. 2 is another schematic diagram showing the architecture of the system for acquiring semiconductor process status information.

A system for acquiring semiconductor process status information comprises external sensors 100–190, AD/DA modules 200–290, protocol converters 300–390, a computer system server 500, a COM port box 510 and equipment servers 600–690.

Equipment servers 600–690 send a start command to the computer system server 500, and receive semiconductor process status information from the computer system server 500, both according to HSMS protocol.

The computer system server 500 comprises a first COM port 400 and a second COM port 410. The first COM port 400 and the second COM port 410 are RS232 COM port. The COM port box 510 comprises COM ports 420–490. Typically, computer system server 500 can support a number of protocol converters corresponding to available COM ports.

The protocol converters 300–390 convert a start command from the RS232 protocol to the RS485 protocol, and output the converted command to corresponding AD/DA modules. In the reverse operation, the protocol converters 300–390 convert semiconductor process status information from the RS485 protocol to the RS232 protocol and output the converted information to corresponding computer system server 500.

AD/DA modules 200–209 are connected to the protocol converter for conversion of the start command from RS485 to analog and output of the converted command to a corresponding external sensor, as well as, in the reverse operation, conversion of the start command from analog to RS485 protocol and output of the converted information to corresponding protocol converter.

External sensors 100–109 acquire semiconductor process status information in response to the start command, and output information to a corresponding AD/DA module.

Semiconductor process status information can include temperature, pressure, flow rate, consistency, rotational speed, voltage value, and electric current value, with standard voltage value of ±15 mV, ±50 mV, ±100 mV, ±150 mV, ±500 mV, ±1V, ±2.5V, ±5V or ±10V. Standard current input is ±0~20 mA or ±4~20 mA. Standard direct sensor input is from a thermocouple (such as J, K, T, E, R, S, or B type) or a RTD (Resistance Temperature Detector, such as Pt, Ni, or Balco alloy RTD).

Figure 3:
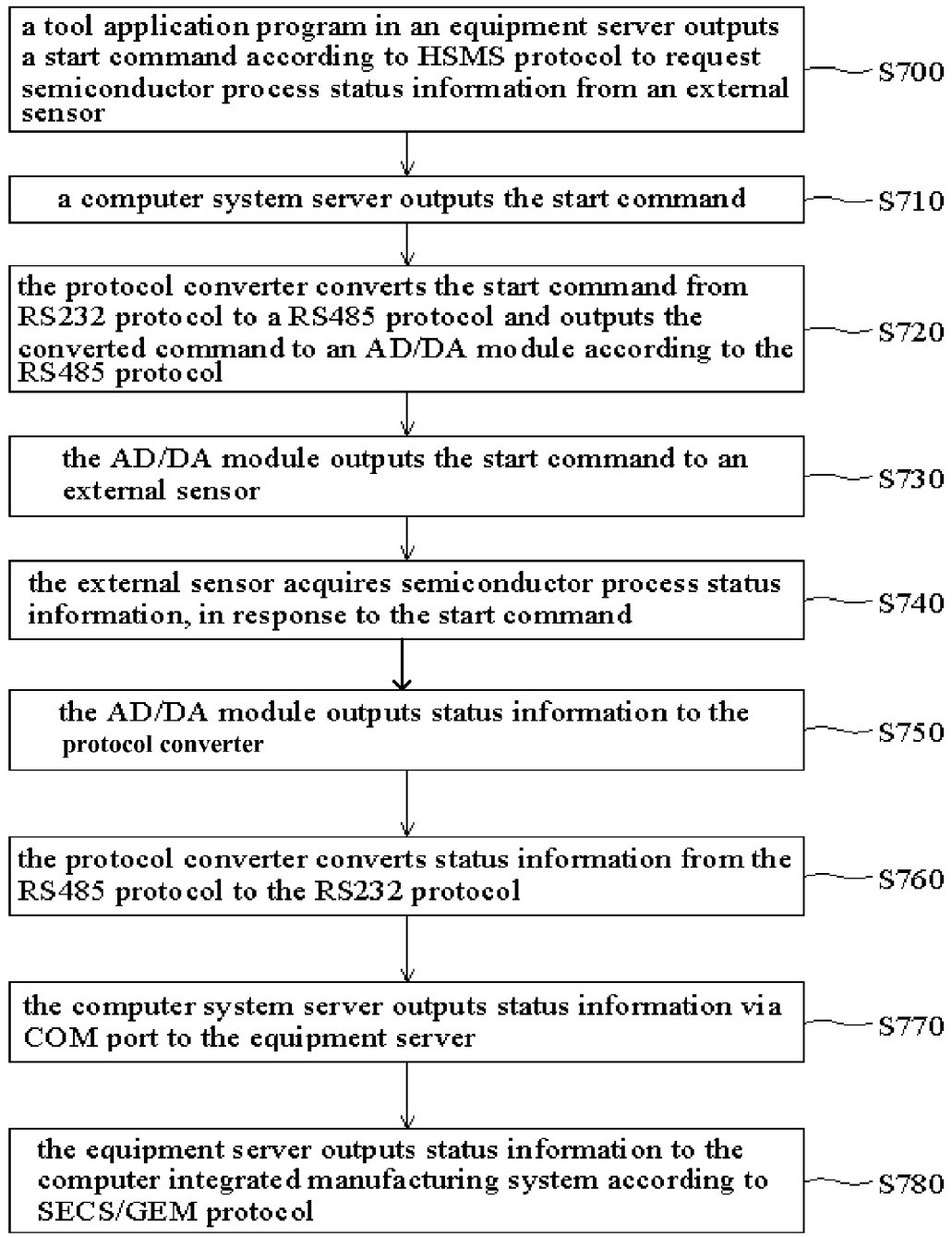
FIG. 3 is a flowchart illustrating the method for acquiring semiconductor process status information according to the present invention.

FIG. 3 is a flowchart illustrating the method for acquiring semiconductor process status information.

First, in step S700, a tool application program in an equipment server outputs a start command according to HSMS protocol to request semiconductor process status information from an external sensor. The external sensor outputs requested information to the equipment server. A reading time is set up for the tool application program, wherein the equipment server outputs a start command corresponding to HSMS protocol regularly according to the preset time.

In step S710, a computer system server outputs the start command. The computer system server converts the start command from HSMS protocol to a RS232 protocol and outputs the converted command to a protocol converter.

Then, in step S720, the protocol converter converts the start command from RS232 protocol to a RS485 protocol and outputs the converted command to an AD/DA module according to the RS485 protocol.

In step S730, the AD/DA module outputs the start command to an external sensor. The AD/DA module converts the start command from the RS485 protocol to an analog signal and outputs the converted command to the external sensor.

In step S740, the external sensor acquires semiconductor process status information, in response to the start command. The external sensor acquires status information and outputs the information to the AD/DA module.

Then, in step S750, the AD/DA module outputs status information to the protocol converter. The AD/DA module converts status information from the analog signal to the RS485 protocol which can be accepted by protocol converter. The AD/DA module outputs the converted status information to the protocol converter.

In step S760, the protocol converter converts status information from the RS485 protocol to the RS232 protocol, suitable for processing by the computer system server, and outputs the converted status information thereto.

In step S770, the computer system server outputs status information via COM port to the equipment server.

Finally, in step S780, the equipment server outputs status information to the computer integrated manufacturing system according to SECS/GEM protocol.

According to the present invention, a system and method for acquiring semiconductor process status information, a computer system server, protocol converter, AD/DA module, and external sensor, via COM port of the computer system server, connect to the equipment server and restart it. Thus, equipment server downtime almost is significantly decreased, increasing output and productivity.

The present invention provides a system and method for acquiring semiconductor process status information. The computer integrated manufacturing system via standard automation protocol conversion (SECS/HSMS/GEM) requests the external sensor to acquire semiconductor process status information and returns the acquired values to the computer integrated manufacturing system, enabling semiconductor equipment installations to prevent missed operation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for acquiring semiconductor process status information, comprising:

an equipment server for sending a start command according to a first protocol;

a computer system server connected to the equipment server for converting the start command from the first protocol to a second protocol and outputting the converted start command;

a protocol converter connected to the computer system server for converting the start command from the second protocol to a third protocol and outputting the converted command according to the third protocol;

an AD/DA module connected to the protocol converter for converting the start command from the third protocol to an analog signal and outputting the converted command;

an external sensor connected to the AD/DA module for acquiring semiconductor process status information as initiated by the start command;

wherein the AD/DA module converts the semiconductor process status information from analog signals to the third protocol and outputs the converted information to the protocol converter; the protocol converter converts the semiconductor process status information from the third protocol to the second protocol and outputs the converted information to the computer system server; and the computer system server outputs the converted information to the equipment server.

2. The system as claimed in claim 1, wherein the status information comprises temperature, pressure, flow rate, consistency, rotational speed, voltage value, or electric current value.

3. The system as claimed in claim 1, wherein standard voltage value input of the semiconductor process status information are ±15 mV, ±50 mV, ±100 mV, ±150 mV, ±500 mV, ±1V, ±2.5V, ±5V, or ±10V.

4. The system, as claimed in claim 1, wherein standard current input of the semiconductor process status information is 0~20 mA or ±4~20 mA.

5. The system as claimed in claim 1, wherein standard direct sensor input of the semiconductor process status information is from a thermocouple or a resistance temperature detector (RTD).

6. The system as claimed in claim 1, wherein standard digital input of the semiconductor process status information is high or low.

7. A system for acquiring semiconductor process status information, comprising:

an equipment server for outputting a start command according to a HSMS protocol;

a computer system server connected to the equipment server for converting the start command from the HSMS protocol to a RS232 protocol and outputting the converted command;

a protocol converter connected to the computer system server for converting the start command from the RS232 protocol to a RS485 protocol and outputting the converted command;

an AD/DA module connected to the protocol converter for converting the start command from the RS485 command to an analog signal and outputting the converted command;

an external sensor connected to the AD/DA module for acquiring semiconductor process status information as initiated by the start command;

wherein the AD/DA module converts the semiconductor process status information from analog signals to the RS485 protocol and outputs the converted information to the protocol converter; the protocol converter converts the semiconductor process status information from the RS485 protocol to the RS232 protocol and outputs the converted information to the computer system server; and the computer system server outputs the semiconductor process status information to the equipment server.

8. The system as claimed in claim 7, wherein the status information comprises temperature, pressure, flow rate, consistency, rotational speed, voltage value, or electric current value.

9. The system as claimed in claim 7, wherein standard voltage value input of the status information is ±15 mV, ±50 mV, ±100 mV, ±150 mV, ±500 mV, ±1V, ±2.5V, ±5V or ±10V.

10. The system, as claimed in claim 7, wherein standard current input of the semiconductor process status information is ±0~20 mA or ±4~20 mA.

11. The system as claimed in claim 7, wherein standard direct sensor input of the semiconductor process status information is from a thermocouple or a resistance temperature detector (RTD).

12. The system as claimed in claim 7, wherein standard digital input of the semiconductor process status information is high or low.

13. A method for acquiring semiconductor process status information, comprising the steps of:

a tool application program outputting a start command according to a HSMS protocol;

converting the start command from the HSMS protocol to a RS232 protocol and outputting the converted start command;

converting the start command from the RS232 protocol to a RS485 protocol and outputting the converted command according to the RS485 protocol;

converting the start command from the RS485 protocol to an analog signal and outputting the converted command;

activation of an external sensor by the start command;

acquiring semiconductor process status information from the external sensor;

converting the semiconductor process status information from analog signals to the RS485 protocol and outputting the converted information according to the RS485 protocol;

converting the semiconductor process status information from the RS485 protocol to the RS232 protocol and outputting the converted information according to the RS232 protocol;

converting the semiconductor process status information from the RS232 protocol to the HSMS protocol; and outputting the semiconductor process status information to an equipment server according to the HSMS protocol.

14. The method as claimed in claim 13, wherein the status information comprises temperature, pressure, flow rate, consistency, rotational speed, voltage value, or electric current value.

15. The method as claimed in claim 13, wherein standard voltage value input of the status information is ±15 mV, ±50 mV, ±100 mV, ±150 mV, ±500 mV, ±1V, ±2.5V, ±5V or ±10V.

16. The method, as claimed in claim 13, wherein standard current input of the semiconductor process status information is ±0~20 mA or ±4~20 mA.

17. The method as claimed in claim 13, wherein standard direct sensor input of the semiconductor process status information is from a thermocouple or a resistance temperature detector (RTD).

18. The method as claimed in claim 13, wherein standard digital input of the semiconductor process status information is high or low.

* * * * *